(12) United States Patent
Wu et al.

(10) Patent No.: US 9,854,593 B2
(45) Date of Patent: *Dec. 26, 2017

(54) CHANNEL QUALITY INDICATOR REPORTING

(71) Applicant: Nokia Solutions and Networks Oy, Espoo (FI)

(72) Inventors: Chunli Wu, Beijing (CN); Benoist P. Sebire, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/186,712

(22) Filed: Jun. 20, 2016

(65) Prior Publication Data

US 2016/0323902 A1  Nov. 3, 2016

Related U.S. Application Data

(63) Continuation of application No. 14/618,297, filed on Feb. 10, 2015, now Pat. No. 9,401,796, which is a (Continued)

(51) Int. Cl.
*H04W 72/08* (2009.01)
*H04W 72/04* (2009.01)
(Continued)

(52) U.S. Cl.
CPC ......... *H04W 72/085* (2013.01); *H04L 5/0048* (2013.01); *H04L 5/0057* (2013.01);
(Continued)

(58) Field of Classification Search
CPC ........... H04W 72/085; H04W 72/0413; H04W 52/365; H04W 72/082; H04W 72/0473;
(Continued)

(56) References Cited

U.S. PATENT DOCUMENTS 9,007,933 B2    4/2015    Wu et al. ............... 370/252
9,055,565 B2    6/2015    Kim et al.
(Continued)

FOREIGN PATENT DOCUMENTS

WO    WO-2011123555 A1    10/2011

OTHER PUBLICATIONS

"3GPP TS 36.213", 3rd Generation Partnership Project;Technical Specification Group Radio Access Network; Evolved Universal Terrestrial Radio Access (E-UTRA); Physical layer procedures (Release 10), 3GPP Standard; France, No. V10.0.1, Dec. 28, 2010 (Dec. 28, 2010).*

(Continued)

*Primary Examiner* — Andrew Chriss
*Assistant Examiner* — Ellen Kirillova
(74) *Attorney, Agent, or Firm* — Harrington & Smith

(57) ABSTRACT

A method, computer program and apparatus operate when resuming data transmission/reception upon activation of a serving cell, or after a long in-device coexistence interference avoidance gap, to determine whether to report to a network access node an in-device coexistence interference indicator value and send the in-device coexistence interference indicator value to the network access node, The in-device coexistence interference indicator value is reported to the network access node for a certain period if any periodic channel quality indication resource is configured for the cell, or if an aperiodic channel quality indication for the cell is requested from the network access node.

28 Claims, 14 Drawing Sheets

Related U.S. Application Data continuation of application No. 13/344,711, filed on Jan. 6, 2012, now Pat. No. 9,007,933.

(60) Provisional application No. 61/430,594, filed on Jan. 7, 2011.

(51) Int. Cl.
| | |
|---|---|
| *H04W 52/36* | (2009.01) |
| *H04L 5/00* | (2006.01) |
| *H04W 8/24* | (2009.01) |
| *H04W 28/04* | (2009.01) |
| *H04W 76/02* | (2009.01) |
| *H04W 88/06* | (2009.01) |

(52) U.S. Cl.
CPC ..... *H04W 52/365* (2013.01); *H04W 72/0406* (2013.01); *H04W 72/0413* (2013.01); *H04W 72/0473* (2013.01); *H04W 72/082* (2013.01); *H04W 8/24* (2013.01); *H04W 28/048* (2013.01); *H04W 76/028* (2013.01); *H04W 88/06* (2013.01)

(58) Field of Classification Search
CPC . H04W 72/0406; H04W 8/24; H04W 28/048; H04W 88/06; H04W 76/028; H04L 5/0048
USPC .......................................................... 370/252
See application file for complete search history.

(56) References Cited

U.S. PATENT DOCUMENTS

| | | | |
|---|---|---|---|
| 9,401,796 B2 * | 7/2016 | Wu | H04W 72/0406 |
| 2004/0179493 A1 | 9/2004 | Khan | |
| 2005/0201474 A1 | 9/2005 | Cho et al. | |
| 2006/0146749 A1 | 7/2006 | Lundh et al. | 370/331 |
| 2008/0153506 A1 | 6/2008 | Yin et al. | |
| 2008/0161003 A1 | 7/2008 | Brueck et al. | 455/437 |
| 2008/0165698 A1 * | 7/2008 | Dalsgaard | H04W 24/10 370/252 |
| 2009/0088177 A1 | 4/2009 | Yang et al. | 455/452.2 |
| 2009/0135730 A1 | 5/2009 | Scott et al. | 370/252 |
| 2009/0161545 A1 | 6/2009 | Ho et al. | 370/235 |
| 2010/0003979 A1 | 1/2010 | Iwamura et al. | 455/436 |
| 2010/0130219 A1 * | 5/2010 | Cave | H04W 72/02 455/450 |
| 2011/0134774 A1 * | 6/2011 | Pelletier | H04W 52/365 370/252 |
| 2011/0149792 A1 | 6/2011 | Nakano et al. | 370/252 |
| 2011/0201279 A1 | 8/2011 | Suzuki et al. | 455/67.11 |
| 2012/0071103 A1 | 3/2012 | Kadous et al. | 455/63.1 |
| 2012/0113825 A1 * | 5/2012 | Baglin | H04W 24/00 370/252 |
| 2012/0176947 A1 | 7/2012 | Xi et al. | 370/311 |
| 2012/0307757 A1 | 12/2012 | Edler Von Elbwart et al. | 370/329 |
| 2014/0301348 A1 | 10/2014 | Chmiel et al. | 370/329 |

OTHER PUBLICATIONS

"3GPP TSG RAN WG2 #72", Panasonic, Nov. 15-19, 2010.*
"3$^{rd}$ Generation Partnership Project, 3-5, Technical Specification Group Radio Access 13-15 Network; Evolved Universal Terrestrial Radio Access (E-UTRA); Physical layer procedures (Release 18)", 3GPP Standard, France, No. V10.0.1, Dec. 28, 2010.
"Report uf 3urr TSG-u2 meeting 172", 3GPP Draft; vol. RAN WG2, No. Dublin, Ireland; Jan. 17, 2011, Jan. 25, 2011 (2811-01-25).
3GPP TS 36.321 V10.0.0 (Dec. 2010) "3$^{rd}$ Generation Partnership Project; Technical Specification Group Radio Access Network; Evolved Universal Terrestrial Radio Access (E-UTRA); Medium Access Control (MAC) protocol specification (Release 10)", pp. 1-53; 3$^{rd}$ Generation Partnership Project (#GPP); Mobile Competence Centre; 650, Route des Lucioles, F-06921 Sophia-Antipolis Cedex, France.
RAN2, "LS on Timing Requirements for Activation and Deactivation of SCells"; 3GPP TSG-RAN2 Meeting#71 bis, R2-106016, Oct. 15, 2010, whole documents in particular 5$^{th}$ para. In section 1, citation not enclosed due to http://www.3gpp.org/ftp/tsg_ran.wg2_r12/TSGR2_71bis/LSout/.
R2-106519; Panasonic; "Handling of SCell Radio Link Monitoring"; 3GPP TSG-RAN WG2 #72; Nov. 15-19, 2010, Jacksonville, USA.
R4-103433; NTT DOCOMO; "Way forward on Scell Radio Link monitoring"; 3GPP TSG-RAN WG4 #56; Madrid, Spain Aug. 23-27, 2010.
R2-106432; Alcatel-Lucent, Alcatel-Lucent Shanghai Bell; "The need of Radio Link Monitoring for SCell"; TSG-RAN WG2#72; Oct. 15-19, 2010, Jacksonville, USA.
R1-106360; Qualcomm Incorporated; "Remaining details of feedback for TM9"; 3GPP TSG-RAN WG1 #63; Nov. 15-19, 2010, Jacksonville, USA.
R1-105865; Ericsson, ST-Ericsson; "Measurements for UE Feedback"; 3GPP TSG-RAN WG1 #63; Jacksonville, USA, Nov. 15-Nov. 19, 2010.
R2-106358; New Postcom; "Clarifications of running MAC CR"; 3GPP TSG-RAN2#72; Nov. 15-19, 2010, Jacksonville, US.
3GPP TR 36.913 V9.0.0, "3rd Generation Partnership Project; Technical Specification Group Radio Access Network; Requirements for further advancements for Evolved Universal Terrestrial Radio Access (E-UTRA) (LTE-Advanced) (Release 9)", Dec. 2009, 15 pages.
3GPP TS 36.300 V8.11.0, "Technical Specification 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", Dec. 2009, 148 pages.
3GPP TS 36.213 V10.0.1, "Technical Specification 3rd Generation Partnership Project; Technical Specification Group Radio Access Network; Evolved Universal Terrestrial Radio Access (E-UTRA); Physical layer procedures (Release 10)", Dec. 2010, 98 pages.
3GPP TR 36.912 V9.2.0, "3rd Generation Partnership Project; Technical Specification Group Radio Access Network; Feasibility study for Further Advancements for E-UTRA (LTE-Advanced) (Release 9)", Mar. 2010, 61 pages.
3GPP TR 36.816 v1.0.0, "3rd Generation Partnership Project; Technical Specification Group Radio Access Networks; Evolved Universal Terrestrial Radio Access (E-UTRA); Study on signalling and procedure for interference avoidance for in-device coexistence; (Release 10)", Nov. 2010, 34 pages.
Samsung, 3GPP TSG-RAN2#72 meeting, R2-106507, "SCell activation and CQI reporting", Jacksonville, U.S, Nov. 2010, 3 pages.
3GPP TS 36.211 V10.0.0, "Technical Specification 3rd Generation Partnership Project; Technical Specification Group Radio Access Network; Evolved Universal Terrestrial Radio Access (E-Utra); Physical channels and modulation (Release 10)", Dec. 2010, 103 pages.
3GPP TSG-RAN WG4 meeting #57, R4-104930, "[Draft] Response LS on Timing Requirements for Activation and Deactivation of SCells", Jacksonville, USA, Nov. 15-19, 2010, 1 page.
3GPP TSG RAN WG1 Meeting #62bis, R1-105534, "Remaining Details of Transmission Mode 9 and DCI 2C", Xi'an, China, Oct. 11-15, 2010, 7 pages.
ETSI MCC, TSG-RAN Working Group 2 meeting #72bis R2-110679, "Report of 3GPP TSG RAN WG2 meeting #72, Jacksonville, USA, Nov. 15-19, 2010", Dublin, Ireland, Jan. 17-21, 2011, 166 pages.

* cited by examiner

MAPPING FROM CSI REFERENCE SIGNAL CONFIGURATION TO (k', l') FOR NORMAL CYCLIC PREFIX

| | CSI REFERENCE SIGNAL CONFIGURATION | NUMBER OF CSI REFERENCE SIGNALS CONFIGURED | | | | | |
|---|---|---|---|---|---|---|---|
| | | 1 OR 2 | | 4 | | 8 | |
| | | (k',l') | $n_s$ MOD 2 | (k',l') | $n_s$ MOD 2 | (k',l') | $n_s$ MOD 2 |
| FRAME STRUCTURE TYPE 1 AND 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| FRAME STRUCTURE TYPE 2 ONLY | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

FIG.1b-1

MAPPING FROM CSI REFERENCE SIGNAL CONFIGURATION TO (k', l')
FOR EXTENDED CYCLIC PREFIX

| CSI REFERENCE SIGNAL CONFIGURATION | NUMBER OF CSI REFERENCE SIGNALS CONFIGURED | | | | | |
| --- | --- | --- | --- | --- | --- | --- |
| | 1 OR 2 | | 4 | | 8 | |
| | (k',l') | $n_s$ MOD 2 | (k',l') | $n_s$ MOD 2 | (k',l') | $n_s$ MOD 2 |
| 0 | (11, 4) | 0 | (11, 4) | 0 | (11, 4) | 0 |
| 1 | (9, 4) | 0 | (9, 4) | 0 | (9, 4) | 0 |
| 2 | (10, 4) | 1 | (10, 4) | 1 | (10, 4) | 1 |
| 3 | (9, 4) | 1 | (9, 4) | 1 | (9, 4) | 1 |
| 4 | (5, 4) | 0 | (5, 4) | 0 | | |
| 5 | (3, 4) | 0 | (3, 4) | 0 | | |
| 6 | (4, 4) | 1 | (4, 4) | 1 | | |
| 7 | (3, 4) | 1 | (3, 4) | 1 | | |
| 8 | (8, 4) | 0 | | | | |
| 9 | (6, 4) | 0 | | | | |
| 10 | (2, 4) | 0 | | | | |
| 11 | (0, 4) | 0 | | | | |
| 12 | (7, 4) | 1 | | | | |
| 13 | (6, 4) | 1 | | | | |
| 14 | (1, 4) | 1 | | | | |
| 15 | (0, 4) | 1 | | | | |
| 16 | (11, 1) | 1 | (11, 1) | 1 | (11, 1) | 1 |
| 17 | (10, 1) | 1 | (10, 1) | 1 | (10, 1) | 1 |
| 18 | (9, 1) | 1 | (9, 1) | 1 | (9, 1) | 1 |
| 19 | (5, 1) | 1 | (5, 1) | 1 | | |
| 20 | (4, 1) | 1 | (4, 1) | 1 | | |
| 21 | (3, 1) | 1 | (3, 1) | 1 | | |
| 22 | (8, 1) | 1 | | | | |
| 23 | (7, 1) | 1 | | | | |
| 24 | (6, 1) | 1 | | | | |
| 25 | (2, 1) | 1 | | | | |
| 26 | (1, 1) | 1 | | | | |
| 27 | (0, 1) | 1 | | | | |

FRAME STRUCTURE TYPE 1 AND 2: rows 0–15
FR: rows 16–17

FIG.1c-1

CSI REFERENCE SIGNAL SUBFRAME CONFIGURATION

| CSI-RS-SubframeConfig $I_{CSI-RS}$ | CSI-RS PERIODICITY $T_{CSI-RS}$ (SUBFRAMES) | CSI-RS SUBFRAME OFFSET $\Delta_{CSI-RS}$ (SUBFRAMES) |
|---|---|---|
| 0–4 | 5 | $I_{CSI-RS}$ |
| 5–14 | 10 | $I_{CSI-RS}-5$ |
| 15–34 | 20 | $I_{CSI-RS}-15$ |
| 35–74 | 40 | $I_{CSI-RS}-35$ |
| 75–154 | 80 | $I_{CSI-RS}-75$ |

FIG.1d

PDSCH TRANSMISSION SCHEME ASSUMED FOR CQI REFERENCE RESOURCE

| TRANSMISSION MODE | TRANSMISSION SCHEME OF PDSCH |
|---|---|
| 1 | SINGLE-ANTENNA PORT, PORT 0 |
| 2 | TRANSMIT DIVERSITY |
| 3 | TRANSMIT DIVERSITY IF THE ASSOCIATED RANK INDICATOR IS 1, OTHERWISE LARGE DELAY CDD |
| 4 | CLOSED-LOOP SPATIAL MULTIPLEXING |
| 5 | MULTI-USER MIMO |
| 6 | CLOSED-LOOP SPATIAL MULTIPLEXING WITH A SINGLE TRANSMISSION LAYER |
| 7 | IF THE NUMBER OF PBCH ANTENNA PORTS IS ONE, SINGLE-ANTENNA PORT, PORT 0; OTHERWISE TRANSMIT DIVERSITY |
| 8 | IF THE UE IS CONFIGURED WITHOUT PMI/RI REPORTING: IF THE NUMBER OF PBCH ANTENNA PORTS IS ONE, SINGLE-ANTENNA PORT, PORT 0; OTHERWISE TRANSMIT DIVERSITY<br>IF THE UE IS CONFIGURED WITH PMI/RI REPORTING: CLOSED-LOOP SPATIAL MULTIPLEXING |
| 9 | CLOSED-LOOP SPATIAL MULTIPLEXING WITH UP TO 8 LAYER TRANSMISSION, PORTS 7–14 (SEE SUBCLAUSE 7.1.5B) |

FIG.1f

ROOT INDICES FOR THE PRIMARY
SYNCHRONIZATION SIGNAL

| $N_{ID}^{(2)}$ | ROOT INDEX u |
|---|---|
| 0 | 25 |
| 1 | 29 |
| 2 | 34 |

FIG.1e

4-BIT CQI TABLE

| CQI INDEX | MODULATION | CODE RATE x 1024 | EFFICIENCY |
|---|---|---|---|
| 0 | OUT OF RANGE | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

FIG.1g

```
┌─────────────────────────────────────────────────┐
│   WHEN RESUMING DATA TRANSMISSION/RECEPTION UPON│
│  ACTIVATION OF A SERVING CELL, OR AFTER A LONG IN-│
│    DEVICE COEXISTENCE INTERFERENCE AVOIDANCE GAP,│
│   WHERE A VALID CHANNEL QUALITY INDICATION RESULT IS│
│   AVAILABLE AT THE LATEST: (A) 4 MS AFTER ACTIVATION│
│    FOR TRANSMISSION MODES OTHER THAN TRANSMISSION│
│    MODE 9; AND (B) UNTIL THE FIRST SUBFRAME THAT HAS│
│      A CHANNEL STATE INFORMATION REFERENCE SIGNAL│
│     AVAILABLE AFTER ACTIVATION +4MS FOR TRANSMISSION│── 6A
│   MODE 9, DETERMINING WHETHER TO REPORT TO A NETWORK│
│     ACCESS NODE NO CHANNEL QUALITY INDICATION VALUE,│
│   OR TO REPORT AN HISTORIC CHANNEL QUALITY INDICATION│
│      VALUE, OR TO REPORT AN OUT OF RANGE CHANNEL│
│   QUALITY INDICATION VALUE FOR A CERTAIN PERIOD IF ANY│
│     PERIODIC CHANNEL QUALITY INDICATION RESOURCE IS│
│   CONFIGURED FOR THE CELL, OR IF AN APERIODIC CHANNEL│
│    QUALITY INDICATION FOR THE CELL IS REQUESTED FROM│
│                 THE NETWORK ACCESS NODE│
└─────────────────────────────────────────────────┘
                          │
                          ▼
┌─────────────────────────────────────────────────┐
│              REPORTING A VALID CHANNEL│
│  QUALITY INDICATION IF AVAILABLE, OTHERWISE REPORTING NO│
│  CHANNEL QUALITY INDICATION VALUE, OR REPORTING ONE │── 6B
│  OF THE HISTORIC CHANNEL QUALITY INDICATION VALUE OR│
│   THE OUT OF RANGE CHANNEL QUALITY INDICATION VALUE│
└─────────────────────────────────────────────────┘
```

FIG.6

CHANNEL QUALITY INDICATOR REPORTING

CROSS REFERENCE TO RELATED APPLICATIONS

This patent application is a continuation application of U.S. patent application Ser. No. 14/618,297, filed Feb. 10, 2015 which is a continuation application of U.S. patent application Ser. No. 13/344,711, filed Jan. 6, 2012, which claims priority under 35 U.S.C. §119(e) from Provisional Patent Application No. 61/430,594, filed Jan. 7, 2011, the disclosure of which are incorporated by reference herein in its entirety.

TECHNICAL FIELD

The exemplary and non-limiting embodiments of this invention relate generally to wireless communication systems, methods, devices and computer programs and, more specifically, relate to the reporting of channel quality indicator information from a mobile node to a network access node.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:
3GPP third generation partnership project
BS base station
CA carrier aggregation
CC component carrier
CE control element
CQI channel quality indication
CSI RS channel state information reference signal
DL downlink (eNB towards UE)
eNB E-UTRAN Node B (evolved Node B).
EPC evolved packet core
E-UTRAN evolved UTRAN (LTE)
FDMA frequency division multiple access
GNSS global navigation satellite system
ICO in-device coexistence interference avoidance
IMTA international mobile telecommunications association
ITU-R international telecommunication union-radiocommunication sector
LTE long term evolution of UTRAN (E-UTRAN)
LTE-A LTE advanced
MAC medium access control (layer 2, L2)
SU-MIMO single user multiple input multiple output
MM/MME mobility management/mobility management entity
NodeB base station
OFDMA orthogonal frequency division multiple access
O&M operations and maintenance
OOR out of range
PDCP packet data convergence protocol
PHY physical (layer 1, L1)
Rel release
RLC radio link control
RRC radio resource control
RRM radio resource management
SCell serving cell
SGW serving gateway
SC-FDMA single carrier, frequency division multiple access
TM transmission mode
UE user equipment, such as a mobile station, mobile node or mobile terminal
UL uplink (UE towards eNB)
UPE user plane entity
UTRAN universal terrestrial radio access network One modern communication system is known as evolved UTRAN (E-UTRAN, also referred to as UTRAN-LTE or as E-UTRA). In this system the DL access technique is OFDMA, and the UL access technique is SC-FDMA.

One specification of interest is 3GPP TS 36.300, V8.11.0 (2009-December), 3rd Generation Partnership Project; Technical Specification Group Radio Access Network; Evolved Universal Terrestrial Radio Access (E-UTRA) and Evolved Universal Terrestrial Access Network (EUTRAN); Overall description; Stage 2 (Release 8), incorporated by reference herein in its entirety. This system may be referred to for convenience as LTE Rel-8. In general, the set of specifications given generally as 3GPP TS 36.xyz (e.g., 36.211, 36.311, 36.312, etc.) may be seen as describing the Release 8 LTE system. More recently, Release 9 versions of at least some of these specifications have been published.

FIG. 1 reproduces FIG. 4.1 of 3GPP TS 36.300 V8.11.0, and shows the overall architecture of the EUTRAN system (Rel-8). The E-UTRAN system includes eNBs, providing the E-UTRAN user plane (PDCP/RLC/MAC/PHY) and control plane (RRC) protocol terminations towards the UEs. The eNBs are interconnected with each other by means of an X2 interface. The eNBs are also connected by means of an S1 interface to an EPC, more specifically to a MME by means of a S1 MME interface and to a S-GW by means of a S1 interface (MME/S-GW 4). The S1 interface supports a many-to-many relationship between MMEs/S-GWs/UPEs and eNBs.

The eNB hosts the following functions:
functions for RRM: RRC, Radio Admission Control, Connection Mobility Control, Dynamic allocation of resources to UEs in both UL and DL (scheduling);
IP header compression and encryption of the user data stream;
selection of a MME at UE attachment;
routing of User Plane data towards the EPC (MME/S-GW);
scheduling and transmission of paging messages (originated from the MME);
scheduling and transmission of broadcast information (originated from the MME or O&M); and
a measurement and measurement reporting configuration for mobility and scheduling.

Of particular interest herein are the further releases of 3GPP LTE (e.g., LTE Rel-10) targeted towards future IMTA systems, referred to herein for convenience simply as LTE-Advanced (LTE-A). Reference in this regard may be made to 3GPP TR 36.913, V9.0.0 (2009-December), 3rd Generation Partnership Project; Technical Specification Group Radio Access Network; Requirements for Further Advancements for E-UTRA (LTE-Advanced) (Release 9). Reference can also be made to 3GPP TR 36.912 V9.2.0 (2010-March) Technical Report 3rd Generation Partnership Project; Technical Specification Group Radio Access Network; Feasibility study for Further Advancements for E-UTRA (LTE-Advanced) (Release 9).

A goal of LTE-A is to provide significantly enhanced services by means of higher data rates and lower latency with reduced cost. LTE-A is directed toward extending and optimizing the 3GPP LTE Rel-8 radio access technologies to provide higher data rates at lower cost. LTE-A will be a more optimized radio system fulfilling the ITU-R requirements for IMT-Advanced while keeping the backward compatibility with LTE Rel-8.

As is specified in 3GPP TR 36.913, LTE-A should operate m spectrum allocations of different sizes, including wider spectrum allocations than those of LTE Rel-8 (e.g., up to 100 MHz) to achieve the peak data rate of 100 Mbit/s for high mobility and 1 Gbit/s for low mobility. It has been agreed that carrier aggregation (CA) is to be considered for LTE-A in order to support bandwidths larger than 20 MHz. Carrier aggregation, where two or more component carriers (CCs) are aggregated, is considered for LTE-A in order to support transmission bandwidths larger than 20 MHz. The carrier aggregation could be contiguous or non-contiguous. This technique, as a bandwidth extension, can provide significant gains in terms of peak data rate and cell throughput as compared to non-aggregated operation as in LTE Rel-8.

A terminal may simultaneously receive one or multiple component carriers depending on its capabilities. A LTE-A terminal with reception capability beyond 20 MHz can simultaneously receive transmissions on multiple component carriers. A LTE Rel-8 terminal can receive transmissions on a single component carrier only, provided that the structure of the component carrier follows the Rel-8 specifications. Moreover, it is required that LTE-A should be backwards compatible with Rel-8 LTE in the sense that a Rel-8 LTE terminal should be operable in the LTE-A system, and that a LTE-A terminal should be operable in a Rel-8 LTE system.

Of some relevance to the discussion herein is 3GPP TR 36.816 v1.0.0 (2010-November) Technical Report 3rd Generation Partnership Project; Technical Specification Group Radio Access Networks; Evolved Universal Terrestrial Radio Access (E-UTRA); Study on signalling and procedure for interference avoidance for in-device coexistence; (Release 10), incorporated by reference herein.

As is stated in Section 4 of 3GPP TR 36.816 v1.0.0, in order to allow users to access various networks and services ubiquitously an increasing number of UEs are equipped with multiple radio transceivers. For example, a UE may be equipped with LTE, WiFi, and Bluetooth transceivers, and GNSS receivers. One resulting challenge lies in trying to avoid coexistence interference between those collocated radio transceivers. FIG. 3, which reproduces FIG. 4-1 of 3GPP TR 36.816 v1.0.0, shows an example of coexistence interference.

Due to extreme proximity of multiple radio transceivers within the same UE, the transmit power of one transmitter may be much higher than the received power level of another receiver. By means of filter technologies and sufficient frequency separation, the transmit signal may not result in significant interference. But for some coexistence scenarios, e.g., different radio technologies within the same UE operating on adjacent frequencies, current state-of-the-art filter technology may not provide sufficient rejection. Therefore, solving the interference problem by single generic RF design may not always be possible and alternative methods need to be considered.

SUMMARY

The below summary section is intended to be merely exemplary and non-limiting.

The foregoing and other problems are overcome, and other advantages are realized, by the use of the exemplary embodiments of this invention.

In an exemplary embodiment of the invention, an apparatus is disclosed with is configured to, in response to activation of a serving cell for the apparatus, report to a network access node for the serving cell a valid channel quality indication result following a timing that is explicitly specified by the activation of the serving cell for the apparatus.

In another exemplary embodiment of the invention there is provided a method which includes, in response to activation of a serving cell for the apparatus, reporting to a network access node for the serving cell a valid channel quality indication result following a timing that is explicitly specified by the activation of the serving cell for an apparatus.

In another exemplary embodiment of the invention, an apparatus is disclosed which is configured to operate upon resuming data transmission/reception upon activation of a serving cell, or after a long in-device coexistence interference avoidance gap. In operation the apparatus determines whether to report to a network access node an in-device coexistence interference indicator value. Thereafter, the apparatus sends the in-device coexistence interference indicator value to the network access node. The apparatus reports the in-device coexistence interference indicator value to the network access node for a certain period if any periodic channel quality indication resource is configured for the cell, or if an aperiodic channel quality indication for the cell is requested from the network access node.

In another exemplary embodiment of the invention there is provided a method which includes method steps which occur when resuming data transmission/reception upon activation of a serving cell, or after a long in-device coexistence interference avoidance gap. The method includes a step of determining whether to report to a network access node an in-device coexistence interference indicator value. Thereafter, the method provides for sending the in-device coexistence interference indicator value to the network access node. The method reports the in-device coexistence interference indicator value to the network access node for a certain period if any periodic channel quality indication resource is configured for the cell, or if an aperiodic channel quality indication for the cell is requested from the network access node.

In another exemplary embodiment of the invention there is provided a non-transitory computer readable medium storing a program of machine-readable instructions executable by a digital processing apparatus of a computer system to perform operations for controlling computer system actions. The operations comprising operation which are preformed when resuming data transmission/reception upon activation of a serving cell, or after a long in-device coexistence interference avoidance gap, determining whether to report to a network access node an in-device coexistence interference indicator value. Thereafter, the non-transitory computer readable medium performs an operation of sending the in-device coexistence interference indicator value to the network access node. The non-transitory computer readable medium reports the in-device coexistence interference indicator value to the network access node for a certain period if any periodic channel quality indication resource is configured for the cell, or if an aperiodic channel quality indication for the cell is requested from the network access node.

In another exemplary embodiment of the invention there is provided an apparatus which includes means responsive to resuming data transmission/reception upon activation of a serving cell, or after an in-device coexistence interference avoidance gap. To determine whether to report to a network access node an in-device coexistence interference indicator value. A means for sending the in-device coexistence interference indicator value to the network access node, wherein the apparatus reports the in-device coexistence interference indicator value to the network access node for a certain period if any periodic channel quality indication resource is configured for the cell, or if an aperiodic channel quality indication for the cell is requested from the network access node.

BRIEF DESCRIPTION OF THE DRAWINGS

In the attached Drawing Figures:

FIG. 1(b-2) reproduces Tables 6.10.5.2-1 of 3GPP TS 36.211.

FIG. 1(b-3) reproduces Tables 6.10.5.2-1. of 3GPP TS 36.211.

FIG. 1(c-1) reproduces Tables 6.10.5.2-2 of 3GPP TS 36.211 and shows a mapping from CSI reference signal configured to (k', l') for extended cyclic prefix.

FIG. 1(c-2) reproduces Tables 6.10.5.2-2 of 3GPP TS 36.211.

FIG. 1(c-3) reproduces Tables 6.10.5.2-2 of 3GPP TS 36.211.

FIG. 1(d) reproduces Table 6.10.5.3-1 of 3GPP TS 36.211 and shows CSI reference signal subframe configuration.

FIG. 1(e) reproduces Table 6.11.1.1-1 of 3GPP TS 36.211 and shows root indices for the primary synchronization signal.

FIG. 1(f) reproduces Table 7.2.3-0 of 3GPP TS 36.213 and shows PDSCH transmission scheme assumed for CQI reference resource.

FIG. 1(g) reproduces Table 7.2.3-1 of 3GPP TS 36.213 and shows a 4-bit CQI Table.

FIG. 6 is a logic flow diagram that illustrates the operation of a method, and a result of execution of computer program instructions embodied on a computer readable memory, in accordance with the exemplary embodiments of this invention.

DETAILED DESCRIPTION

By way of an introduction, it was agreed in RAN4 (R4-104930, Response LS on Timing Requirements for Activation and Deactivation of SCells, 3GPP TSG-RAN WG4 meeting #57, Jacksonville, United States of America, 15-19 Nov. 2010, incorporated by reference) that when the eNB sends an activation/deactivation MAC CE activating an SCell in sub-frame n, the UE must have the SCell activated by subframe n+8, and there is no need to start measuring the SCell before subframe n+8. Thus it is possible for some certain period that the UE does not have a valid CQI result immediately after activation of the SCell.

A similar period exists upon resuming data transmission/reception from a long gap of TDM for in-device coexistence interference avoidance (ICO).

Figure 1A:
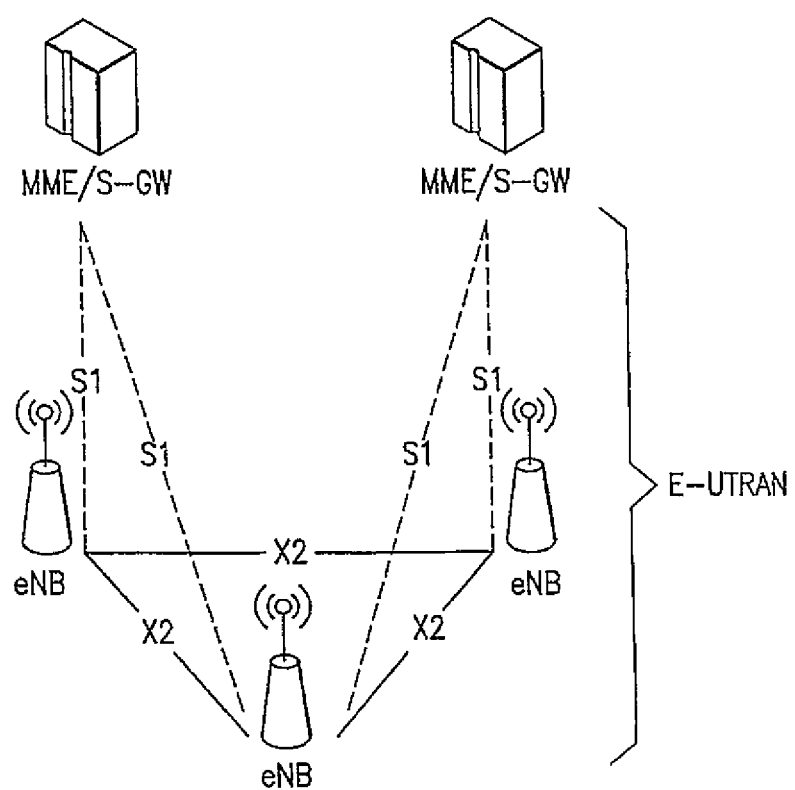
FIG. 1(a) reproduces FIG. 4.1 of 3GPP TS 36.300, and shows the overall architecture of the EUTRAN system.
Figures 1, 1B, 2:
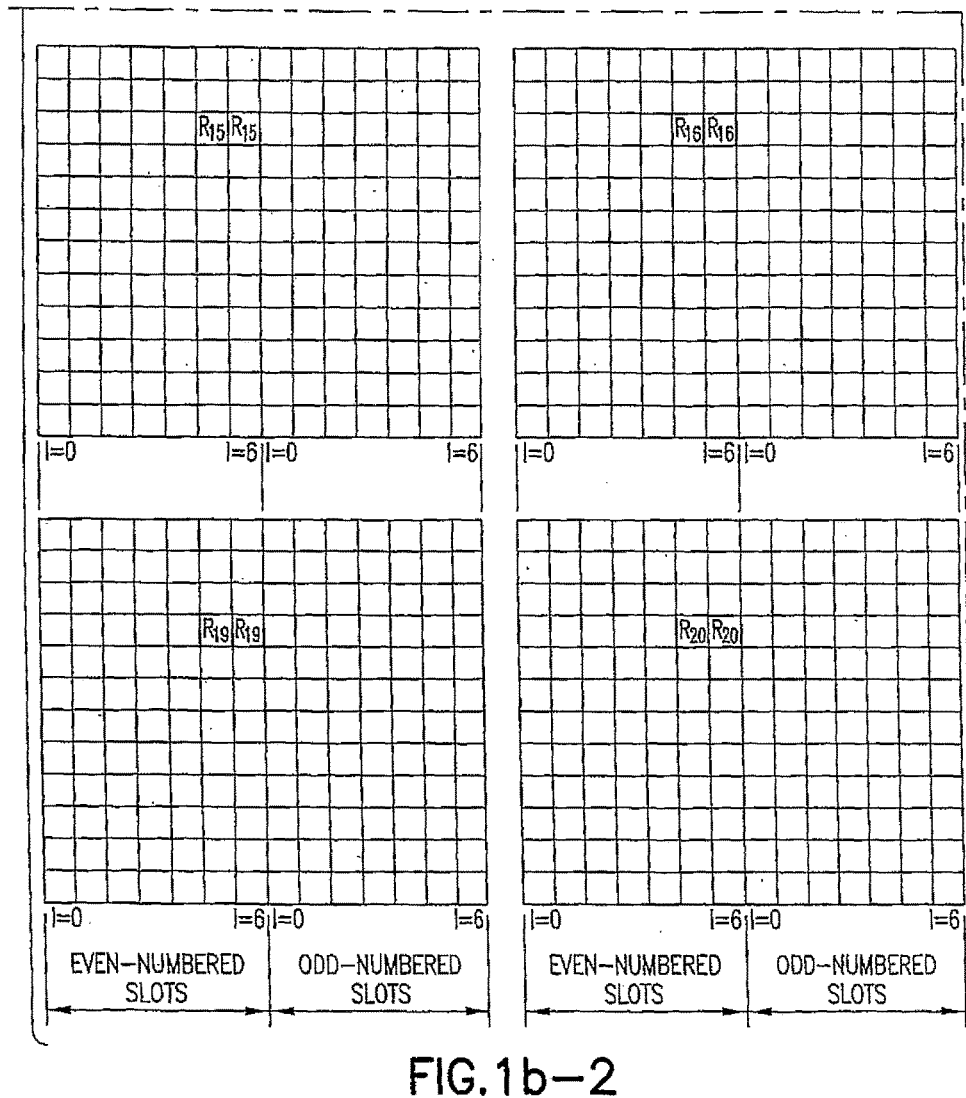
FIG. 1(b) indicates that FIGS. 1(b-1), 1(b-2) and 1(b-3) reproduce Tables 6.10.5.2-1 of 3GPP TS 36.211.
FIG. 1(b-1) reproduces Tables 6.10.5.2-1 of 3GPP TS 36.211 and shows a mapping from CSI reference signal configured to (k', l') for normal cyclic prefix.
FIG. 2 shows a simplified block diagram of various electronic devices that are suitable for use in practicing the exemplary embodiments of this invention.
Figures 1, 1B, 2, 3:
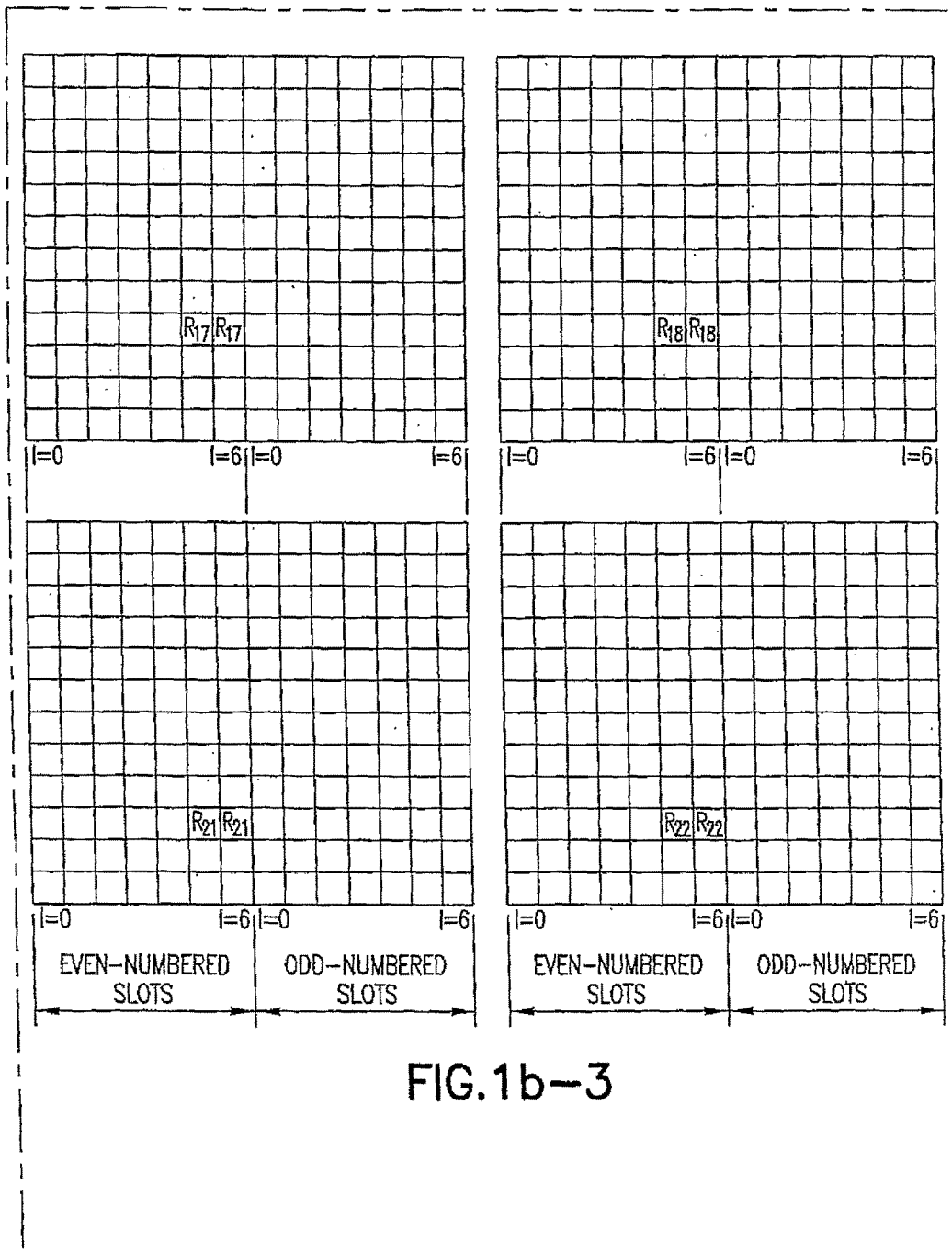
FIG. 3 reproduces FIG. 4-1 of 3GPP TR 36.816 v1.0.0 and shows an example of coexistence interference.

One agreement in RAN2 to aid in solving the problems discussed above with reference to 3GPP TR 36.816 v1.0.0 and shown in FIG. 3 is for the UE to inform the E-UTRAN when transmission/reception of LTE or some other radio signal would benefit, or no longer benefit, from the LTE system not using certain carriers or frequency resources. The UE judgment is therefore taken as a baseline approach for a Frequency Domain Multiplexing (FDM) solution where the UE indicates which frequencies are (not) useable due to in-device coexistence. In response to such signaling from the UE the eNB would typically order the UE to perform a handover to a frequency that has not been reported by the UE as suffering from in-device coexistence interference. This approach may be referred to as an FDM solution. However, when this is not possible a Time Domain Multiplexing (TDM) solution could be used. The TDM solution could involve alternating scheduled and unscheduled periods on problematic frequencies.

Figure 4A:
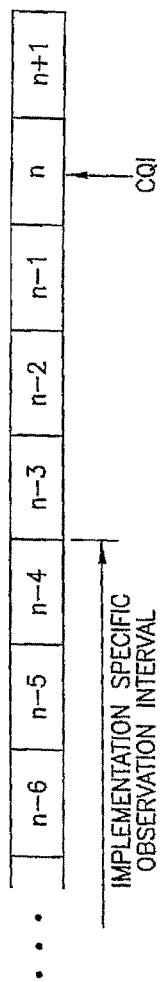
FIG. 4A reproduces FIG. 1 from R2-106507 and shows an example of processing time for a CQI measurement.
Figure 4B:
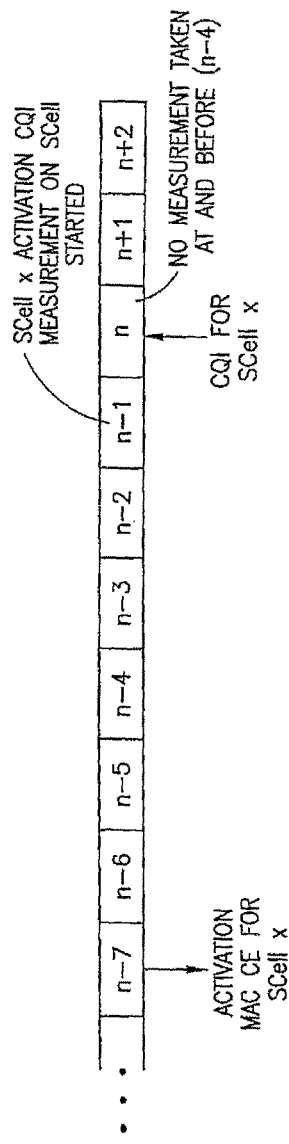
FIG. 4B reproduces FIG. 2 from R2-106507 and shows an example of where the UE is not able to report CQI for a SCell immediately after the SCell is activated.

However, the period could be 4 ms of UE processing time for measurement if the RS for measurement is available every TTI. Reference in this regard can be made to FIG. 4A herein, which reproduces FIG. 1 from 3GPP TSG-RAN2 #72 meeting Tdoc R2-106507 Jacksonville, U.S., 15-19 Nov. 2010 Agenda Item: 7.1.1.4, Source: Samsung, Title: SCell activation and CQI reporting (incorporated by reference). Reference can also be made to FIG. 4B herein, which reproduces FIG. 2 from R2-106507 and shows an example of where the UE is not able to report CQI for a SCell immediately after the SCell is activated. As is stated in R2-106507, the issue is whether the UE transmits CQI even if it does not have a valid measurement. It is assumed in R2-106507 that if the UE is required to transmit the CQI even if it has no measurement result the only logical CQI value to be reported is CQI=0 (i.e., out of range or OOR). Thus it would be the choice between "no CQI transmission" and "OOR reporting".

Transmission Mode 9 (TM9) has been defined for Rel-10 DL MIMO for supporting SU-MIMO up to rank-8 and SU/MU dynamic switching (see, for example, 3GPP TSG RAN WG1 Meeting #62bis R1-105534 Xi'an, China, Oct. 11-15, 2010 Source: Nokia Siemens Networks, Nokia, Title: Remaining Details of Transmission Mode 9 and DCI 2C, incorporated by reference). Reference with regard to TM9 can also be made to 3GPP TS 36.211. V10.0.0 (2010-12) Technical Specification 3rd Generation Partnership Project; Technical Specification Group Radio Access Network; Evolved Universal Terrestrial Radio Access (E-UTRA); Physical channels and modulation (Release 10), Section 6.10.5 "CSI reference signals", incorporated by reference herein. As disclosed in ETSI TS 136 211, CSI reference signals are transmitted on one, two, four or eight antenna ports using p=15, p=15,16, p=15, . . . , 18 and p=15, . . . , 22, respectively. CSI reference signals are defined for Δf=15 kHz only. With respect to sequence generation, the reference-signal sequence $r_{l,n_s}(m)$ is defined by $$r_{l,n_s}(m) = \frac{1}{\sqrt{2}}(1 - 2 \cdot c(2m)) + j\frac{1}{\sqrt{2}}(1 - 2 \cdot c(2m+1)),$$

where m=0,1 . . . , $N_{RB}^{max,DL}-1$ where $n_s$ is the slot number within a radio frame and l is the OFDM symbol number within the slot. The pseudorandom sequence c(i). The pseudo-random sequence generator is initialized with $c_{init}=2^{10} \cdot (7 \cdot (n_s+1)+l+1) \cdot (2 \cdot N_{ID}^{cell}+1)+2 \cdot N_{ID}^{cell}+N_{CP}$ at the start of each OFDM symbol where $$N_{CP} \begin{cases} 1 & \text{for normal } CP \\ 0 & \text{for extended } CP \end{cases}$$

With respect to mapping to resource elements in subframes configured for CSI reference signal transmission, the reference signal sequence $r_{l,n_s}(m)$ shall be mapped to complex-valued modulation symbols $a_{k,l}^{(p)}$ used as reference symbols on antenna port p according to $a_{k,l}^{(p)}=w_{l''} \cdot r_{l,n_s}(m')$ where $$k = k' + 12m + \begin{cases} -0 \text{ for } p \in \{15, 16\}, & \text{normal cyclic prefix} \\ -6 \text{ for } p \in \{17, 18\}, & \text{normal cyclic prefix} \\ -1 \text{ for } p \in \{19, 20\}, & \text{normal cyclic prefix} \\ -7 \text{ for } p \in \{21, 22\}, & \text{normal cyclic prefix} \\ -0 \text{ for } p \in \{15, 16\}, & \text{extended cyclic prefix} \\ -3 \text{ for } p \in \{17, 18\}, & \text{extended cyclic prefix} \\ -6 \text{ for } p \in \{19, 20\}, & \text{extended cyclic prefix} \\ -9 \text{ for } p \in \{21, 22\}, & \text{extended cyclic prefix} \end{cases}$$

$$l = l' + \begin{cases} l' & \begin{array}{l}CSI \text{ reference signal} \\ \text{configurations 0-19}\end{array}, \text{ normal cyclic prefix} \\ 2l'' & \begin{array}{l}CSI \text{ reference signal} \\ \text{configurations 20-31}\end{array}, \text{ normal cyclic prefix,} \\ l'' & \begin{array}{l}CSI \text{ reference signal} \\ \text{configurations 0-27}\end{array}, \text{ normal cyclic prefix} \end{cases}$$

$$w_{l''} \begin{cases} l & p \in \{15, 17, 19, 21\} \\ (-1)^{l''} & p \in \{16, 18, 20, 22\} \end{cases},$$

$$l'' = 0, 1,$$

$$m = 0, 1 \ldots, N_{RB}^{DL} - 1, \text{ and}$$

$$m' = m + \left\lfloor \frac{N_{RB}^{max,DL} - N_{RB}^{DL}}{2} \right\rfloor.$$

Figures 1, 1C, 2, 3:
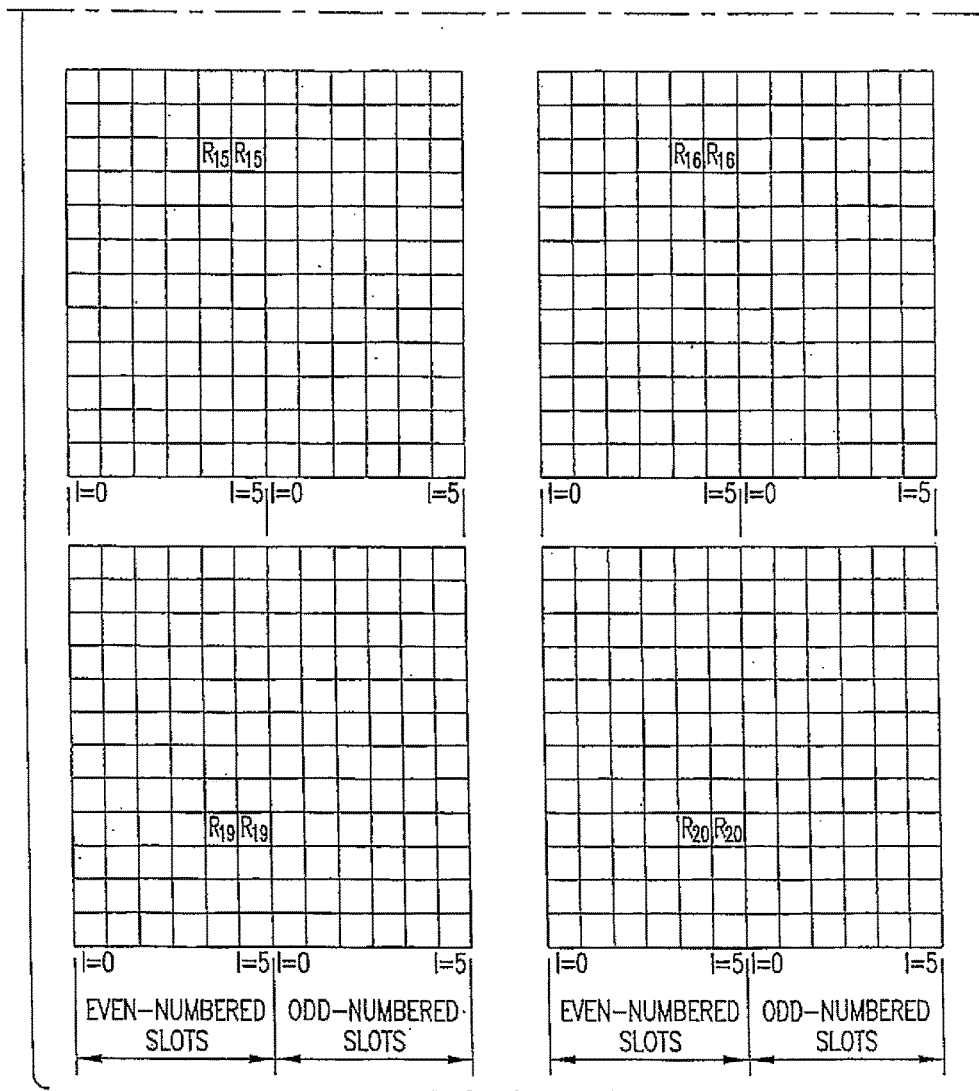
FIG. 1(c) indicates that FIGS. 1(c-1), 1(c-2) and 1(c-3) reproduce Tables 6.10.5.2-2 of 3GPP TS 36.211.
Figures 1, 1C, 2, 3:
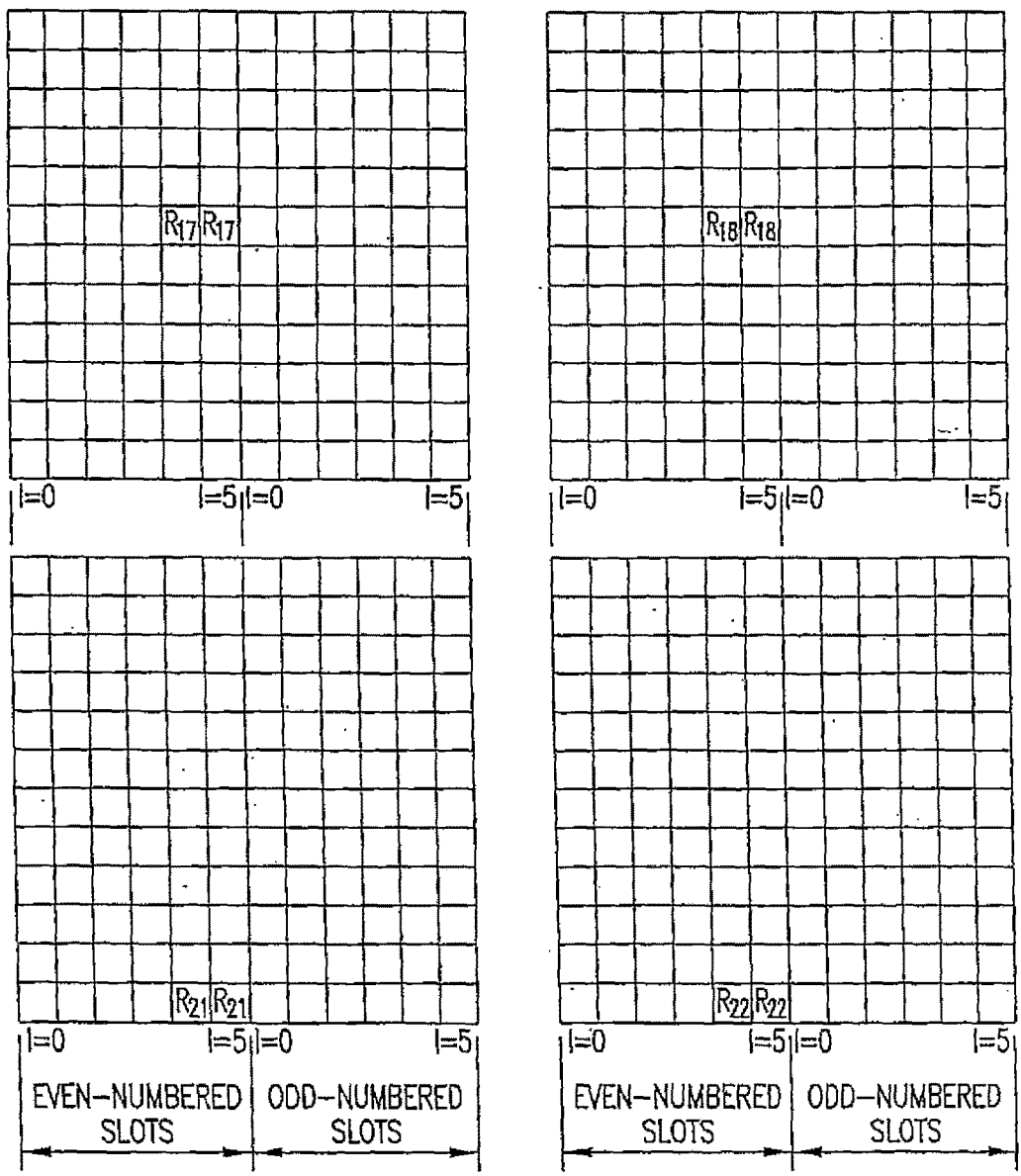
Figure 2:
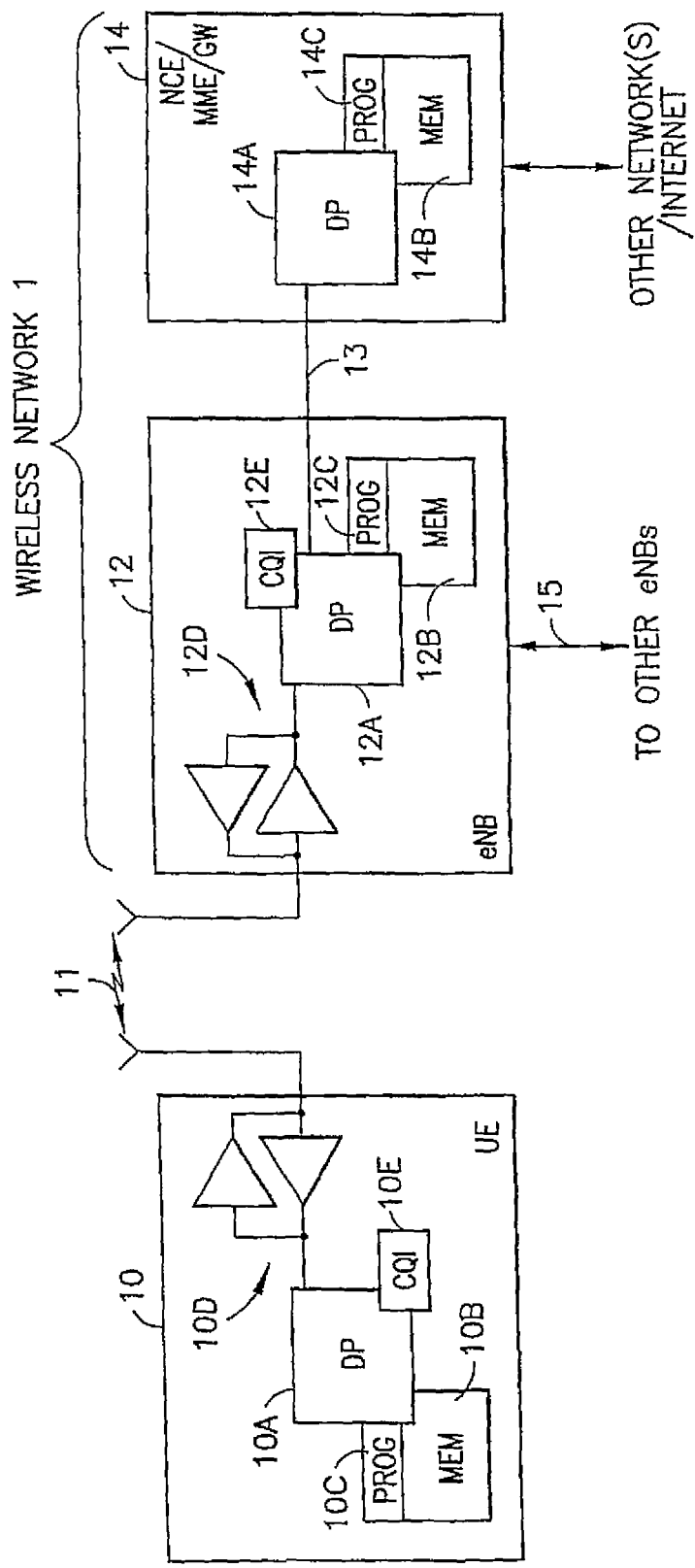
Figure 3:
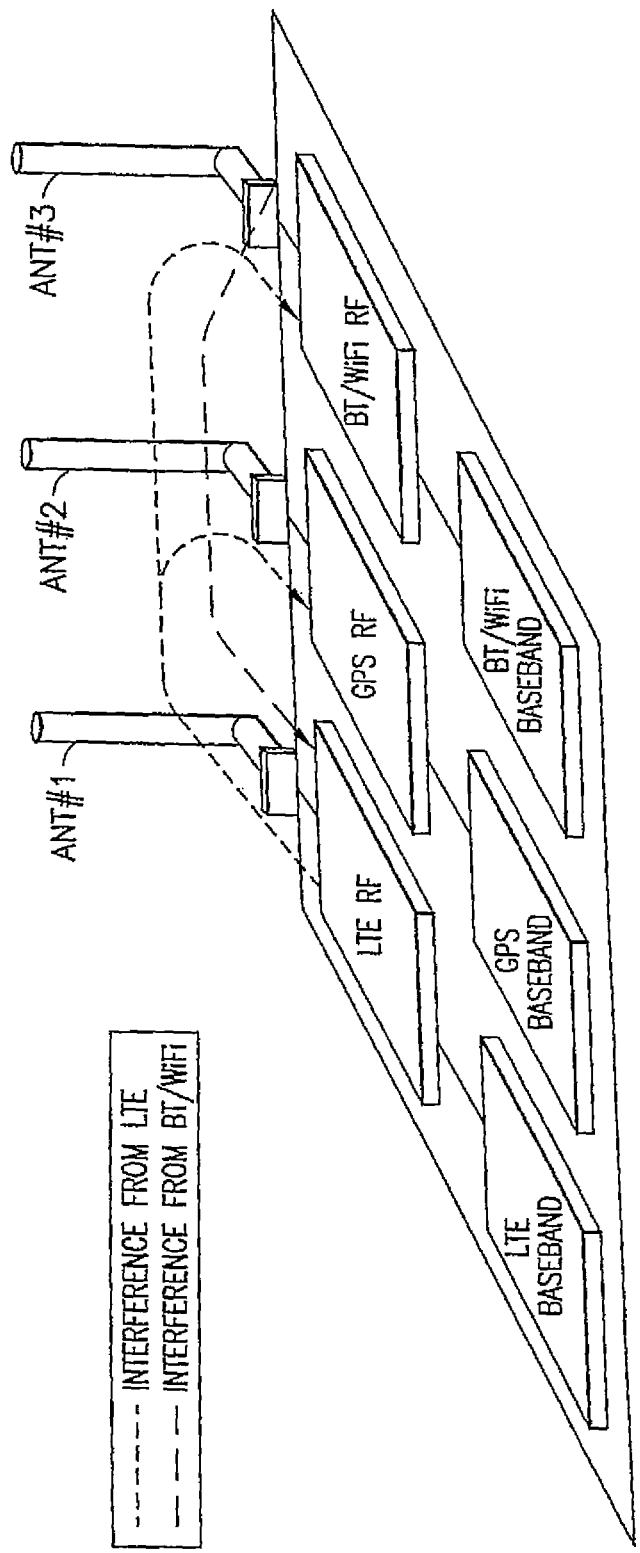

The quantity (k', l') and the necessary conditions on $n_s$ are given by Tables 6.10.5.2-1 and 6.10.5.2-2 for normal cyclic prefix reproduced in FIG. 1(b) and extended cyclic prefix reproduced in FIG. 1(c). Multiple CSI reference signal configurations according to TM 9 can be used in a given cell,
  one configuration for which the UE shall assume non-zero transmission power for the CSI-RS, and
  zero or more configurations for which the UE shall assume zero transmission power.

For each bit set to one in the 16-bit bitmap ZeroPowerCSI-RS configured by higher layers, the UE shall assume zero transmission power for the resource elements corresponding to the four CSI reference signal column in Tables 6.10.5.2-1 and 6.10.5.2-2 for normal and extended cyclic prefix, respectively. The most significant bit corresponds to the lowest CSI reference signal configuration index and subsequent bits in the bitmap correspond to configurations with indices in increasing order.

CSI reference signals according to TM 9 can only occur in
  downlink slots where ns mod 2 fulfils the condition in Tables 6.10.5.2-1 and 6.10.5.2-2 for normal and extended cyclic prefix, respectively, and
  where the subframe number fulfils the conditions set forth in Table 6.10.5.3-1 Moreover, CSI reference signals according to TM 9 cannot be transmitted
  in the special subframe(s) in case of frame structure type 2,
  when transmission of a CSI-RS would collide with transmission of synchronization signals, PBCH, or SystemInformationBlockType1 messages,
  in subframes configured for transmission of paging messages.

Resource elements (k, l) used for transmission of CSI reference signals on any of the antenna ports in the set S, where S={15}, S={15,16}, S={7,18}, S={19,20} or S={21, 22} shall
  not be used for transmission of PDSCH on any antenna port in the same slot, and
  not be used for CSI reference signals on any antenna port other than those in S in the same slot.

With respect to CSI reference signal subframe configuration TM 9, provides that the cell-specific subframe configuration period TCSI-RS and the cell-specific subframe offset ΔCSI-RS for the occurrence of CSI reference signals are listed in Table 6.10.5.3-1 attached as FIG. 1(d). The parameter ICSI-RS can be configured separately for CSI reference signals for which the UE shall assume non-zero and zero transmission power. Subframes containing CSI reference signals shall satisfy $$\left(10n_f + \left\lfloor \frac{n_s}{2} \right\rfloor - \Delta_{CSI-RS}\right) \bmod T_{CSI-RS} = 0.$$

With respect to synchronization signals in TM 9, LTE/LTE-A provides for 504 unique physical-layer cell identities. The physical-layer cell identities are grouped into 168 unique physical-layer cell-identity groups, each group containing three unique identities. The grouping is such that each physical-layer cell identity is part of one and only one physical-layer cell-identity group. A physical-layer cell identity $N_{ID}^{cell}=3N_{ID}^{(1)}+N_{ID}^{(2)}$ is thus uniquely defined by a number $N_{ID}^{(1)}$ in the range of 0 to 167, representing the physical-layer cell-identity group, and a number $N_{ID}^{(2)}$ in the range of 0 to 2, representing the physical-layer identity within the physical-layer cell-identity group.

With respect to primary synchronization signal a sequence is generated according to TM 9 where the sequence d(n) is used for the primary synchronization signal and generated from a frequency-domain Zadoff-Chu sequence according to $$d_u(n) \begin{cases} e^{-j\frac{\pi u n(n+1)}{63}} & n = 0, 1, \ldots 30 \\ e^{-j\frac{\pi u n(n+1)(n+2)}{63}} & n = 31, 32, \ldots, 61 \end{cases}$$

where the Zadoff-Chu root sequence index u is given by Table 6.11.1.1-1 reproduced as FIG. 1(e).

Channel quality indicator (CQI) according to TM 9 is defined in 3GPP TS 36.213 V10.0.1 (2010-12) Technical Specification 3rd Generation Partnership Project; Technical Specification Group Radio Access Network; Evolved Universal Terrestrial Radio Access (E-UTRA); Physical layer procedures (Release 10), Section 7.2.3 "Channel quality indicator (CQI) definition", incorporated by reference herein.

According to TM 9, the CQI indices and their interpretations are given in Table 7.2.3-1 reproduced as FIG. 1(f). Based on an unrestricted observation interval in time and frequency, the UE shall derive for each CQI value reported in uplink subframe n the highest CQI index between 1 and 15 in Table 7.2.3-1 which satisfies the following condition, or CQI index 0 if CQI index 1 does not satisfy the condition:

A single PDSCH transport block with a combination of modulation scheme and transport block size corresponding to the CQI index, and occupying a group of downlink physical resource blocks termed the CQI reference resource, could be received with a transport block error probability not exceeding 0.1.

For TM 9 and feedback reporting modes the UE shall derive the channel measurements for computing the CQI value reported in uplink subframe n based on only the Channel-State Information (CSI) reference signals. For other transmission modes and their respective reporting modes the UE shall derive the channel measurements for computing CQI based on CRS.

A combination of modulation scheme and transport block size corresponds to a CQI index if:

the combination could be signalled for transmission on the PDSCH in the CQI reference resource according to the relevant Transport Block Size table, and the modulation scheme is indicated by the CQI index, and the combination of transport block size and modulation scheme when applied to the reference resource results in the effective channel code rate which is the closest possible to the code rate indicated by the CQI index. If more than one combination of transport block size and modulation scheme results in an effective channel code rate equally close to the code rate indicated by the CQI index, only the combination with the smallest of such transport block sizes is relevant.

The CQI reference resource is defined as follows:

In the frequency domain, the CQI reference resource is defined by the group of downlink physical resource blocks corresponding to the band to which the derived CQI value relates.

In the time domain, the CQI reference resource is defined by a single downlink subframe $n-n_{CQI\_ref}$ where for periodic CQI reporting $n-n_{CQI\_ref}$ is the smallest value greater than or equal to 4, such that it corresponds to a valid downlink subframe;

where for aperiodic CQI reporting nCQI_ref is such that the reference resource is in the same valid downlink subframe as the corresponding CQI request in an uplink DCI format.

where for aperiodic CQI reporting nCQI_ref is equal to 4 and downlink subframe n-nCQI_ref corresponds to a valid downlink subframe, where downlink subframe n-nCQI_ref is received after the subframe with the corresponding CQI request in a Random Access Response Grant.

A downlink subframe shall be considered to be valid if:

it is configured as a downlink subframe for that UE, and except for transmission mode 9, it is not an MBSFN subframe, and it does not contain a DwPTS field in case the length of DwPTS is 7680 □Ts and less, and it does not fall within a configured measurement gap for that UE.

If there is no valid downlink subframe for the CQI reference resource, CQI reporting is omitted in uplink subframe n.

In the layer domain, the CQI reference resource is defined by any RI and PMI on which the CQI is conditioned.

In the CQI reference resource, the UE shall assume the following for the purpose of deriving the CQI index:

The first 3 OFDM symbols are occupied by control signalling

No resource elements used by primary or secondary synchronisation signals or PBCH CP length of the non-MBSFN subframes Redundancy Version 0

If CSI-RS is used for channel measurements, the ratio of PDSCH EPRE to CSI-RS EPRE is as given in Section 7.2.5

The PDSCH transmission scheme given by Table 7.2.3-0 reproduced as FIG. 1(f) depending on the transmission mode currently configured for the UE (which may be the default mode).

If CRS is used for channel measurements, the ratio of PDSCH EPRE to cell-specific RS EPRE is as given in Section 5.2 with the exception of ρ A which shall be assumed to be PA=PA+Δ offset+10log(2) [dB] for any modulation scheme, if the UE is configured with transmission mode 2 with 4 cell-specific antenna ports, or transmission mode 3 with 4 cell-specific antenna ports and the associated RI is equal to one;

ρA=PA+Δoffset [dB] for any modulation scheme and any number of layers, otherwise.

The shift $\Delta_{offset}$ is given by the parameter nomPDSCH-RS-EPRE-Offset which is configured by higher-layer signaling.

Figure 5:
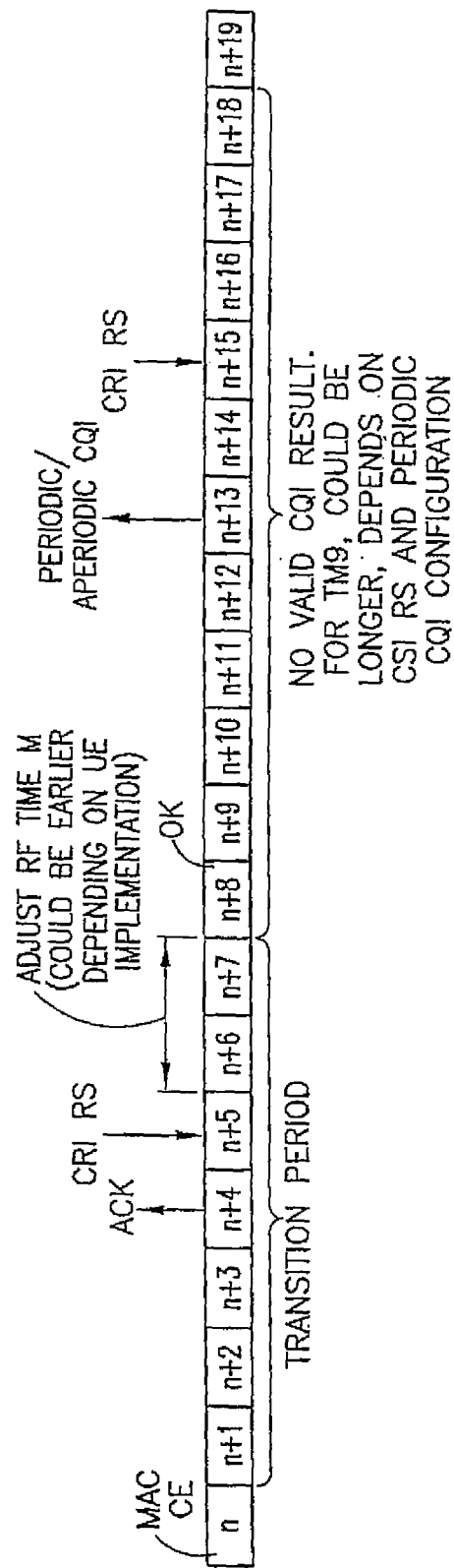
FIG. 5 shows an example of a considerable period of time after activation/end of a gap where there may not be a CSI RS subframe available when using TM9.

In TM9 the CQI measurement is based on CSI RS with a configurable periodicity of 5 ms to about 80 ms. Referring to FIG. 5 it can be seen that it thus is possible that for a considerable period of time after activation/end of a gap there is no CSI RS subframe available, but some periodic CQI resource is configured or aperiodic CQI is requested. The total period could be much longer than 4 ms depending on the CSI RS periodicity and its occurrence after activation.

Several options were suggested in R2-106507 to permit the UE to not transmit CQI or to report OOR (out of range)

for 4 ms after activation. However, R2-106507 did not address the case of TM9 and the resumption of operation after a long ICO gap.

Before describing in further detail the exemplary embodiments of this invention, reference is made to FIG. 2 for illustrating a simplified block diagram of various electronic devices and apparatus that are suitable for use in practicing the exemplary embodiments of this invention. In FIG. 2 a wireless network 1 is adapted for communication over a wireless link 11 with an apparatus, such as a mobile communication device which may be referred to as a UE 10, via a network access node, such as a Node B (base station), and more specifically an eNB 12. The network 1 may include a network control element (NCE) 14 that may include the MME/SGW functionality shown in FIG. 1(a), and which provides connectivity with a further network, such as a telephone network and/or a data communications network (e.g., the internet). The UE 10 includes a controller, such as at least one computer or a data processor (DP) 10A, at least one non-transitory computer-readable memory medium embodied as a memory (MEM) 10B that stores a program of computer instructions (PROG) 10C, and at least one suitable radio frequency (RF) transceiver 10D for bidirectional wireless communications with the eNB 12 via one or more antennas. The eNB 12 also includes a controller, such as at least one computer or a data processor (DP) 12A, at least one computer-readable memory medium embodied as a memory (MEM) 12B that stores a program of computer instructions (PROG) 12C, and at least one suitable RF transceiver 12D for communication with the UE 10 via one or more antennas (typically several when multiple input/multiple output (MIMO) operation is in use). The eNB 12 is coupled via a data/control path 13 to the NCE 14. The path 13 may be implemented as the S1 interface shown in FIG. 1. The eNB 12 may also be coupled to another eNB via data/control path 15, which may be implemented as the X2 interface shown in FIG. 1.

For the purposes of describing the exemplary embodiments of this invention the UE 10 may be assumed to also include a CQI measurement and reporting unit or function or module (CQI) 10E, and the eNB 12 may include a complementary CQI unit or function or module 12E for receiving and interpreting CQI information received from the UE 10. Note also that the transceiver 10D (and related baseband circuitry and antenna) can represent the LTE RF and LTE baseband blocks (and antenna #1) shown in FIG. 3. In addition, the UE 10 can include one or both of the global positioning system (GPS) RF and baseband blocks (and associated antenna #2) and the Bluetooth (BT)/WiFi RF and baseband blocks (and associated antenna #3) of FIG. 3.

At least one of the PROGs 10C and 12C is assumed to include program instructions that, when executed by the associated DP, enable the device to operate in accordance with the exemplary embodiments of this invention, as will be discussed below in greater detail. That is, the exemplary embodiments of this invention may be implemented at least in part by computer software executable by the DP 10A of the UE 10 and/or by the DP 12A of the eNB 12, or by hardware, or by a combination of software and hardware (and firmware). Further in this regard the CQI units 10E, 12E can be implemented entirely in circuitry, or entirely as software code, or as a combination of circuitry and software code (and firmware).

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer-readable memories 10B and 12B may be of any type suitable to the local technical environment and may be implemented using any suitable data storage technology, such as semiconductor based memory devices, random access memory, read only memory, programmable read only memory, flash memory, magnetic memory devices and systems, optical memory devices and systems, fixed memory and removable memory. The data processors 10A and 12A may be of any type suitable to the local technical environment, and may include one or more of general purpose computers, special purpose computers, microprocessors, digital signal processors (DSPs) and processors based on multi-core processor architectures, as non-limiting examples.

In accordance with the exemplary embodiments of this invention, when resuming data transmission/reception upon activation of an SCell, the UE 10 is allowed to report an OOR for the just activated SCell for a certain period if periodic CQI reporting for the cell is configured for the UE 10, or if an aperiodic CQI for the cell is requested from the eNB 12 (normal CQI will be reported for other already activated cells). When resuming data transmission/reception after a long ICO gap, when carrier aggregation (CA) is not configured, the UE 10 is allowed to report an OOR for a certain period if periodic CQI reporting is configured for the UE, or if an aperiodic CQI is requested from the eNB 12. When CA is configured, it applies to all the configured or activated serving cells. That is, the UE 10 is enabled to report a valid CQI if available, otherwise, the UE 10 is enabled to report an OOR. Subsequently the UE 10 reports a valid CQI result.

It should be noted that a CQI report may also be referred to as a channel state information (CSI) report.

For the case of TM9 the certain period is from SCell activation/long ICO gap until the first available CSI RS subframe (potentially plus 4 ms considering the UE 10 processing time for a CQI measurement). For other transmission modes (other than TM9) the period can be the UE processing time for the CQI measurement.

Figure 4C:
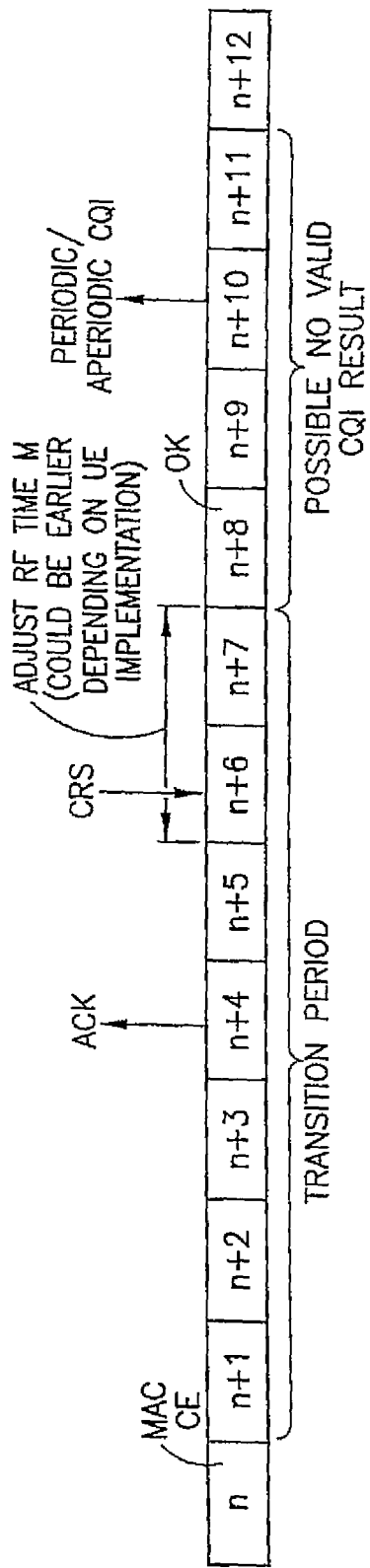
FIG. 4C shows a case of a possible no valid CQI period for transmission modes other than TM9.

To reiterate, even though RAN4 has indicated that the UE 10 is not required to start measuring the activated SCell before subframe n+8, some UE implementations could re-tune the RF and start measuring earlier than n+8, even before n+4 when an acknowledge (ACK) is sent. If measurements are started before n+4, the UE 10 could have a valid CQI result at n+8, and would need no additional "gap" for CQI reporting. If measurements are started after n+4, the size of the "gap" is would depend on the implementation of the UE 10. The longest additional delay is 4 ms after n+8, as CRS for CQI measurement is available every TTI for transmission modes other than TM9, as shown in FIG. 4C.

For TM9, where the CQI measurement is based on CSI RS (per 3GPP TS 36.213) with a configurable periodicity of 5~80 ms (per 3GPP TS 36.211), it is possible that the period without a valid CQI is much longer than 4 ms in the case the UE 10 misses the CSI RS occasion, as shown in FIG. 5. The period could be as long as until the first subframe has CSI RS available, +4 ms considering the UE 10 processing time for CQI measurement.

The time point when the UE 10 has a valid CQI result depends on the transmission mode and the CSI RS configuration. From the point of view of the eNB 12 it may be preferable to specify when the UE 10 should obtain a valid CQI result at the latest to capture the minimum requirement, at the same time allowing an improved UE 10 implementation to report a valid CQI earlier, which is similar to "ending DRX" (discontinuous reception).

It can thus be desirable to specify when the UE 10 should have a valid CQI result at the latest: (a) 4 ms after activation for TMs other than TM9; and (b) until the first subframe has CSI RS available after activation +4 ms for TM9.

Another exemplary embodiment is for the CQI unit 10E to avoid reporting anything before the first occurrence of a CSI RS. In that both the UE 10 and the eNB 12 are aware of the CSI RS pattern no decoding issue should arise at the eNB 12.

Another exemplary embodiment is for the CQI unit 10E to report an historic value before the first occurrence of a CSI RS. In that the eNB 12 is aware that no CSI RS has been transmitted yet, it can assume in this embodiment that the reported CQI is the historic CQI, and it can decide whether to use the reported value or to ignore it.

When the UE10 resumes transmission/reception upon SCell activation, or after a long ICO gap, this explicitly specifies the timing of when a valid CQI result should be reported to ensure scheduling performance. An improved UE 10 implementation can thus benefit if it can have an earlier valid CQI result.

It can be noted that it may be most preferable, with respect to CQI reporting for all configured cells or only for configured and activated cells, to report OOR until the UE 10 has a valid CQI result when a SCell is activated.

It can be further noted that there may be a question as to whether a gap is only for a real activation of a deactivated SCell or also for re-activation. In this regard a deactivation timer and PHR (power headroom report) trigger covers activation of activated or deactivated SCells. However, when considering the CQI reporting that is a subject of the exemplary embodiments of this invention it may be most preferable that the UE 10 should not re-tune the RF for a case of SCell re-activation, and thus no gap for the CQI report should be created.

Based on the foregoing it should be apparent that the exemplary embodiments of this invention provide a method, apparatus and computer program(s) to provide enhanced CQI reporting when TM9 is in use, and generally after a number of subframes have occurred without the UE 10 receiving a CSI RS.

FIG. 6 is a logic flow diagram that illustrates the operation of a method, and a result of execution of computer program instructions, in accordance with the exemplary embodiments of this invention. In accordance with these exemplary embodiments a method performs, at Block 6A, a step of, when resuming data transmission/reception upon activation of a serving cell, or after a long in-device coexistence interference avoidance gap, where a valid channel quality indication result is available at the latest: (a) 4 ms after activation for transmission modes other than transmission mode 9; and (b) until the first subframe that has a channel state information reference signal available after activation +4 ms for transmission mode 9, determining whether to report to a network access node no channel quality indication value, or to report an historic channel quality indication value, or to report an out of range channel quality indication value for a certain period if any periodic channel quality indication resource is configured for the cell, or if an aperiodic channel quality indication for the cell is requested from the network access node. At Block 6B there is a step of reporting a valid channel quality indication if available, otherwise reporting no channel quality indication value, or reporting one of the historic channel quality indication value or the out of range channel quality indication value.

In the method of the preceding paragraph, where the certain period includes processing time for a channel quality indication measurement.

In the method of FIG. 6 and the preceding paragraphs, where when resuming data transmission/reception after a long in-device coexistence interference avoidance gap, when carrier aggregation is not configured, reporting an out of range condition for a certain period if periodic channel quality indication reporting is configured or if an aperiodic channel quality indication is requested, while when carrier aggregation is configured it applies to all configured or activated serving cells.

A non-transitory computer-readable medium that contains software program instructions, where execution of the software program instructions by at least one data processor results in performance of operations that comprise execution of the method of FIG. 6 and the foregoing paragraphs descriptive of FIG. 6.

The various blocks shown in FIG. 6 may be viewed as method steps, and/or as operations that result from operation of computer program code, and/or as a plurality of coupled logic circuit elements constructed to carry out the associated function(s).

In general, the various exemplary embodiments may be implemented in hardware or special purpose circuits, software, logic or any combination thereof For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The exemplary embodiments thus also encompass an apparatus that comprises a processor and a memory that includes computer program code. The memory and computer program code are configured to, with the processor, cause the apparatus at least to, when resuming data transmission/reception upon activation of a serving cell, or after a long in-device coexistence interference avoidance gap, where a valid channel quality indication result is available at the latest: (a) 4 ms after activation for transmission modes other than transmission mode 9; and (b) until the first subframe that has a channel state information reference signal available after activation +4 ms for transmission mode 9, determine whether to report to a network access node no channel quality indication value, or to report an historic channel quality indication value, or to report an out of range channel quality indication value for a certain period if any periodic channel quality indication resource is configured for the cell, or if an aperiodic channel quality indication for the cell is requested from the network access node. The memory and computer program code are further configured to, with the processor, cause the apparatus to report a valid channel quality indication if available, or to otherwise report no channel quality indication value, or to report one of the historic channel quality indication value or the out of range channel quality indication value.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

The exemplary embodiments also encompass an apparatus that comprises means, responsive to resuming data transmission/reception upon activation of a serving cell, or after a long in-device coexistence interference avoidance gap, where a valid channel quality indication result is available at the latest: (a) 4 ms after activation for transmission modes other than transmission mode 9; and (b) until the first subframe that has a channel state information reference signal available after activation +4 ms for transmission mode 9, for determining (e.g., DP 10A, memory 10B, program 10C, CQI 10E) whether to report to a network access node no channel quality indication value, or to report an historic channel quality indication value, or to report an out of range channel quality indication value for a certain period if any periodic channel quality indication resource is configured for the cell, or if an aperiodic channel quality indication for the cell is requested from the network access node. The apparatus further comprises means for reporting (e.g., DP 10A, memory 10B, program 10C, transceiver 10D, CQI 10E) a valid channel quality indication if available, otherwise reporting no channel quality indication value, or reporting one of the historic channel quality indication value or the out of range channel quality indication value.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the (UTRAN LTE-A) system, it should be appreciated that the exemplary embodiments of this invention are not limited for use with only this one particular type of wireless communication system, and that they may be used to advantage in other wireless communication systems, as well as in systems using different combination of technologies (e.g., other than or in addition to LTE cellular, LTE-A cellular, GNSS, Bluetooth and WiFi, which are discussed merely as examples and not in a limiting sense).

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described parameters, modes of operation, subframes, reports and the like (e.g., CQI report, CSI report, CSI RS, TM9, ICO, etc.) are not intended to be limiting in any respect, as these parameters, modes of operation, subframes, reports and the like may be identified by any suitable names. Further, any names assigned to various channels (e.g., PDCCH, etc.) are not intended to be limiting in any respect, as these channels may be identified by any suitable names.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. An apparatus, comprising:
at least one processor; and
at least one memory storing a computer program;
in which the at least one memory with the computer program is configured with the at least one processor to cause the apparatus to at least:
receiving, by Medium Access Control (MAC) signaling from a network access node for a primary serving cell, an activation message specifying that a secondary serving cell is to be activated for the apparatus, wherein the activation message indicates a timing of when a channel quality indication result for the secondary serving cell should be reported, and
reporting to the network access node for the primary serving cell a valid channel quality indication result for the secondary serving cell following the timing, wherein the valid channel quality indication result for the secondary serving cell is not available until a first subframe that has a reference signal is available after the activation of the secondary serving cell.

2. The apparatus according to claim 1, where the apparatus communicates with the network access node in accordance with transmission mode 9.

3. The apparatus according to claim 1, where the reference signal is a channel state information reference signal for transmission mode 9 and is a cell-specific reference signal for transmission modes other than transmission mode 9.

4. The apparatus according to claim 1, wherein when the primary serving cell is activated all configured cells, or only configured and activated cells, report an out of range channel quality indication value to the network access node until the apparatus has the valid channel quality indication result for the secondary serving cell.

5. The apparatus according to claim 1, further comprising: resuming data transmission/reception upon the activation of the secondary serving cell, where a deactivation timer and a power headroom report trigger are provided for determining whether a gap before the resuming data transmission/reception indicates a real activation of a deactivated serving cell or reactivation of the secondary serving cell.

6. The apparatus according to claim 1, where the secondary serving cell is activated after a certain time period including processing time for a channel quality indication measurement for the secondary serving cell.

7. The apparatus according to claim 6, wherein to enable carrier aggregation, the valid channel quality indication result for the secondary serving cell is reported if periodic channel quality indication reporting for the secondary serving cell is configured for the apparatus or if an aperiodic channel quality indication reporting for the secondary serving cell is requested from the network access node, where a minimum requirement is defined for the certain time period before the valid channel quality indication result for the secondary serving cell is reported, and where the valid channel quality indication result for the secondary serving cell is reported no later than the minimum requirement.

8. A method, comprising: receiving, by Medium Access Control (MAC) signaling from a network access node for a primary serving cell, an activation message specifying that a secondary serving cell is to be activated for the apparatus, wherein the activation message indicates a timing of when a channel quality indication result for the secondary serving cell should be reported, and reporting to the network access node for the primary serving cell a valid channel quality indication result for the secondary serving cell following the timing, wherein the valid channel quality indication result for the secondary serving cell is not available until a first subframe that has a reference signal is available after the activation of the secondary serving cell.

9. The method according to claim 8, where the apparatus communicates with the network access node in accordance with transmission mode 9.

10. The method according to claim 8, where the reference signal is a channel state information reference signal for transmission mode 9 and is a cell-specific reference signal for transmission modes other than transmission mode 9.

11. The method according to claim 8, wherein when the primary serving cell is activated all configured cells, or only configured and activated cells, report an out of range channel quality indication value to the network access node until the apparatus has the valid channel quality indication result for the secondary serving cell.

12. The method according to claim 8, further comprising: resuming data transmission/reception upon the activation of the secondary serving cell, where a deactivation timer and a power headroom report trigger are provided for determining whether a gap before the resuming data transmission/reception indicates a real activation of a deactivated serving cell or reactivation of the secondary serving cell.

13. The method according to claim 8, where the secondary serving cell is activated after a certain time period including processing time for a channel quality indication measurement for the secondary serving cell.

14. The apparatus according to claim 13, wherein to enable carrier aggregation, the valid channel quality indication result for the secondary serving cell is reported if periodic channel quality indication reporting for the secondary serving cell is configured for the apparatus or if an aperiodic channel quality indication reporting for the secondary serving cell is requested from the network access node, where a minimum requirement is defined for the certain time period before the valid channel quality indication result for the secondary serving cell is reported, and where the valid channel quality indication result for the secondary serving cell is reported no later than the minimum requirement.

15. An apparatus, comprising:
at least one processor; and
at least one memory storing a computer program;
in which the at least one memory with the computer program is configured with the at least one processor to cause the apparatus to at least:

transmit to a user equipment, by Medium Access Control (MAC) signaling from the apparatus for a primary serving cell, an activation message specifying that a secondary serving cell is to be activated for the user equipment, wherein the activation message indicates a timing of when a channel quality indication result for the secondary serving cell should be reported; and receive from the user equipment, a valid channel quality indication result for the secondary serving cell following the timing, wherein the valid channel quality indication result for the secondary serving cell is not available until a first subframe that has a reference signal is available after the activation of the secondary serving cell.

16. The apparatus according to claim 15, where the user equipment communicates with the apparatus in accordance with transmission mode 9.

17. The apparatus according to claim 15, where the reference signal is a channel state information reference signal for transmission mode 9 and is a cell-specific reference signal for transmission modes other than transmission mode 9.

18. The apparatus according to claim 15, wherein when the primary serving cell is activated all configured cells, or only configured and activated cells, report an out of range channel quality indication value to the apparatus until the user equipment has the valid channel quality indication result for the secondary serving cell.

19. The apparatus according to claim 15, wherein the user equipment is further configured to resume data transmission/reception upon the activation of the secondary serving cell, and to determine whether a gap before the resuming data transmission/reception indicates a real activation of a deactivated serving cell or reactivation of the secondary serving cell by employing a deactivation timer and a power headroom report trigger.

20. The apparatus according to claim 15, where the secondary serving cell is activated after a certain time period including processing time for a channel quality indication measurement for the secondary serving cell.

21. The apparatus according to claim 20, wherein to enable carrier aggregation, a radio transmission for the secondary serving cell is transmitted from the user equipment after a certain time period, where the radio transmission includes a valid channel quality indication result for the secondary serving cell, where a minimum requirement is defined for the certain time period before the valid channel quality indication result for the secondary serving cell is received by the apparatus from the user equipment, where the valid channel quality indication result for the secondary serving cell is received by the apparatus from the user equipment no later than the minimum requirement.

22. A method, comprising:
transmitting to a user equipment, by Medium Access Control (MAC), an activation message specifying that a secondary serving cell is to be activated for the user equipment, wherein the activation message indicates a timing of when a channel quality indication result for the secondary serving cell should be reported; and receiving from the user equipment, a valid channel quality indication result for the secondary serving cell following the timing, wherein the valid channel quality indication result for the secondary serving cell is not available until a first subframe that has a reference signal is available after the activation of the secondary serving cell.

23. The method according to claim 22, where the user equipment communicates with the apparatus in accordance with transmission mode 9.

24. The method according to claim 22, where the reference signal is a channel state information reference signal for transmission mode 9 and is a cell-specific reference signal for transmission modes other than transmission mode 9.

25. The method according to claim 22, wherein when the primary serving cell is activated all configured cells, or only configured and activated cells, report an out of range channel quality indication value to the apparatus until the user equipment has the valid channel quality indication result for the secondary serving cell.

26. The method according to claim 22, wherein the user equipment is further configured to resume data transmission/reception upon the activation of the secondary serving cell, and to determine whether a gap before the resuming data transmission/reception indicates a real activation of a deactivated serving cell or reactivation of the secondary serving cell by employing a deactivation timer and a power headroom report trigger.

27. The method according to claim 22, where the secondary serving cell is activated after a certain time period including processing time for a channel quality indication measurement for the secondary serving cell.

28. The apparatus according to claim 27, wherein to enable carrier aggregation, a radio transmission for the secondary serving cell is transmitted from the user equipment after a certain time period, where the radio transmission includes a valid channel quality indication result for the secondary serving cell, where a minimum requirement is defined for the certain time period before the valid channel quality indication result for the secondary serving cell is received by the apparatus from the user equipment, where the valid channel quality indication result for the secondary serving cell is received by the apparatus from the user equipment no later than the minimum requirement.

* * * * *